US012692105B2

(12) United States Patent
Thooft et al.

(10) Patent No.: US 12,692,105 B2
(45) Date of Patent: Jul. 28, 2026

(54) SHIPLOADING SYSTEMS, METHODS AND APPARATUS

(71) Applicant: Superior Industries, Inc., Morris, MN (US)

(72) Inventors: Travis Thooft, Morris, MN (US); Lafe Grimm, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 18/623,400

(22) Filed: Apr. 1, 2024

(65) Prior Publication Data

US 2024/0239619 A1 Jul. 18, 2024

Related U.S. Application Data

(63) Continuation of application No. 17/661,646, filed on May 2, 2022, now Pat. No. 11,964,834.

(60) Provisional application No. 63/187,566, filed on May 12, 2021.

(51) Int. Cl.
*B65G 67/60* (2006.01)

(52) U.S. Cl.
CPC .................................. *B65G 67/606* (2013.01)

(58) Field of Classification Search
None
See application file for complete search history.

(56) References Cited

U.S. PATENT DOCUMENTS

| | | | | |
|---|---|---|---|---|
| 4,427,104 A * | 1/1984 | Reid, Jr. .............. | B65G 41/002 |
| | | | 198/313 |
| 5,090,549 A * | 2/1992 | Thiel ...................... | B65G 65/28 |
| | | | 198/312 |
| 6,283,269 B1 * | 9/2001 | Mayer .................. | B65G 41/005 |
| | | | 198/313 |
| 6,360,876 B1 | 3/2002 | Nohl | |
| 7,618,231 B2 | 11/2009 | Felton | |
| 8,251,199 B2 * | 8/2012 | Tebbe .................... | B65G 65/28 |
| | | | 198/312 |
| 8,684,161 B2 | 4/2014 | Gausman | |
| 8,985,301 B2 * | 3/2015 | Werlinger .............. | B65G 21/12 |
| | | | 198/312 |
| 10,696,118 B2 | 6/2020 | Bratton | |
| 10,766,710 B2 | 9/2020 | Bacon-Maldonado, III | |
| 2013/0233682 A1 | 9/2013 | Werlinger | |
| 2017/0334654 A1 | 11/2017 | Friesen | |

FOREIGN PATENT DOCUMENTS

WO    WO 2019/160848 A1    8/2019

OTHER PUBLICATIONS

Great Britain Examination Report in Great Britain Application No. GB2206692.2, dated Mar. 26, 2024, 6 pages.
Great Britain Search Report in Great Britain Application No. GB2206692.2, dated Oct. 12, 2022, pages.

* cited by examiner

*Primary Examiner* — Kavel Singh
(74) *Attorney, Agent, or Firm* — Todd R. Fronek; Larkin Hoffman Daly & Lindgren, Ltd.

(57)    ABSTRACT

Systems, methods and apparatus are provided for shiploading.

20 Claims, 12 Drawing Sheets

SHIPLOADING SYSTEMS, METHODS AND APPARATUS

BACKGROUND

Shiploader conveyors are used to load aggregate material onto ships.

DESCRIPTION

Figure 1:
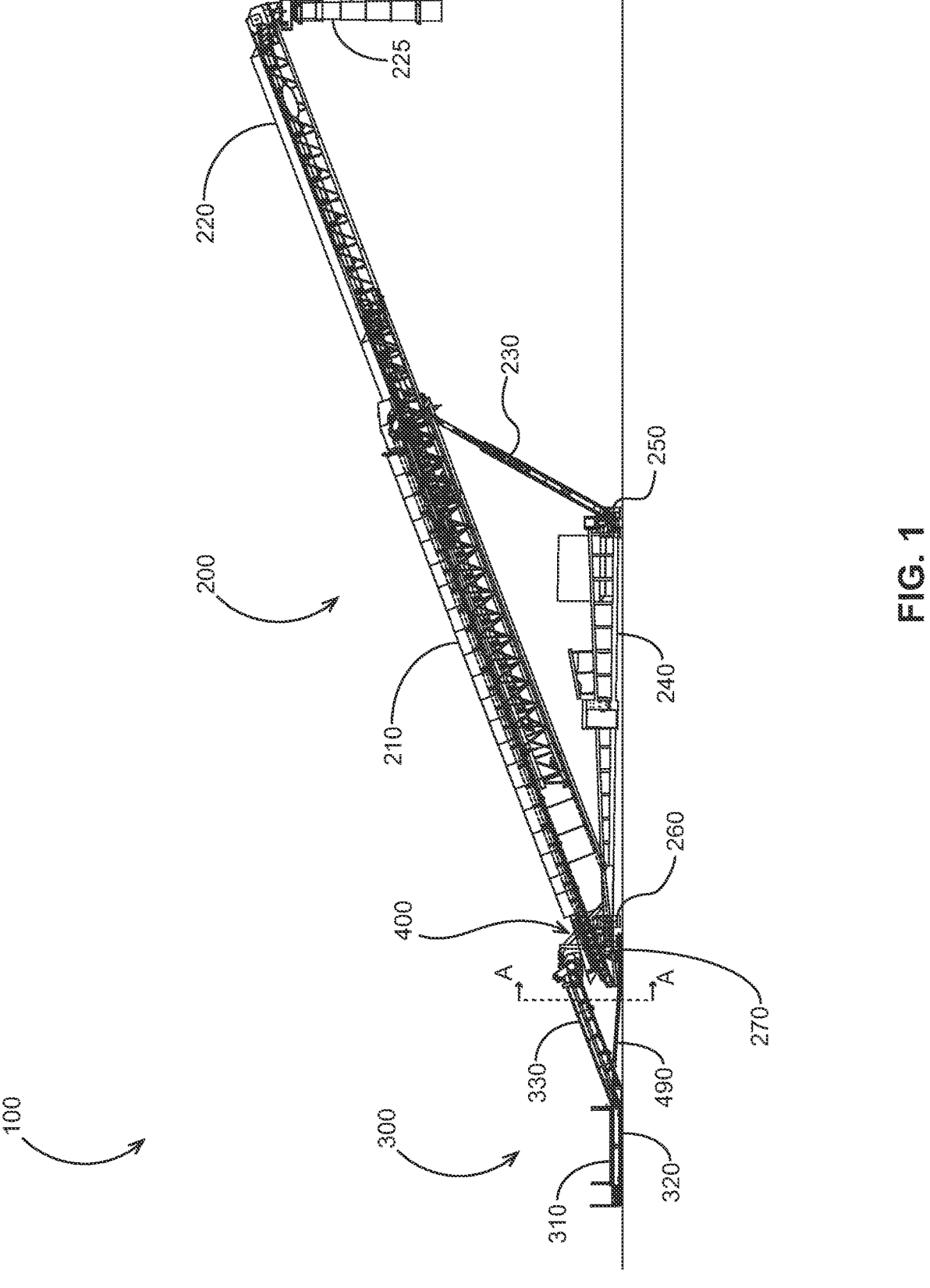
FIG. 1 is a side elevation view of an embodiment of a shiploader system in an operating configuration.

Referring to the drawings, wherein like reference numerals designate identical or corresponding parts throughout the several views, FIGS. 1-7 illustrate an embodiment of a shiploader system 100. The shiploader system 100 optionally comprises a stacking conveyor 200 and a truck unloader 300 configured and disposed to convey material deposited by a truck onto the stacking conveyor 200. The truck unloader 300 is optionally coupled to stacking conveyor 200, e.g., by a coupler 400. The truck unloader 300 is optionally pivotally coupled (e.g., by coupler 400) to stacking conveyor 200 such that the stacking conveyor 200 is pivotable about a generally vertical axis relative to the truck unloader 300 (e.g., for operational radial travel of the stacking conveyor 200). The truck unloader 300 is optionally pivotally coupled (e.g., by coupler 400) to the stacking conveyor 200 such that the truck unloader 300 is pivotable about a generally horizontal axis relative to the stacking conveyor 200 (e.g., in order to life the truck unloader 300 off the ground for transport of the system 100). The shiploader system 100 optionally has an operating configuration in which the truck unloader 300 is optionally at least partially supported on the ground surface. In the operational configuration of the system 100, one or more pairs of axles and/or wheels of the stacking conveyor 200 are optionally in radial travel positions. The shiploader system 100 optionally has a transport configuration in which the truck unloader 300 is supported (e.g., substantially supported, completely supported, etc.) by the stacking conveyor 200 (e.g., via the coupler 400). In the transport configuration of the system

100, one or more pairs of axles and/or wheels of the stacking conveyor 200 are optionally in transport positions.

Figure 2:
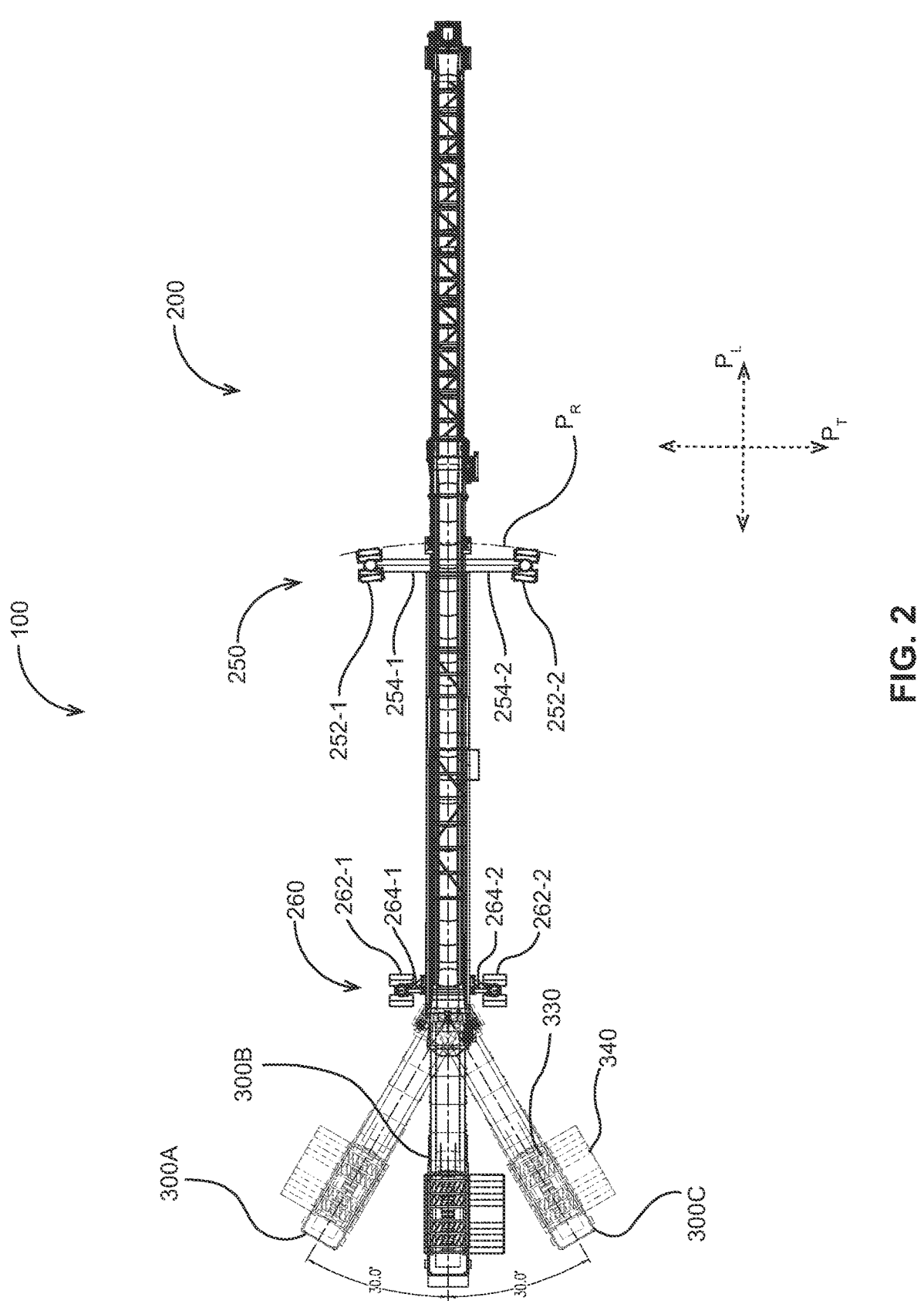
FIG. 2 is a top view of the shiploader system of FIG. 1 in an operating configuration.
Figure 3:
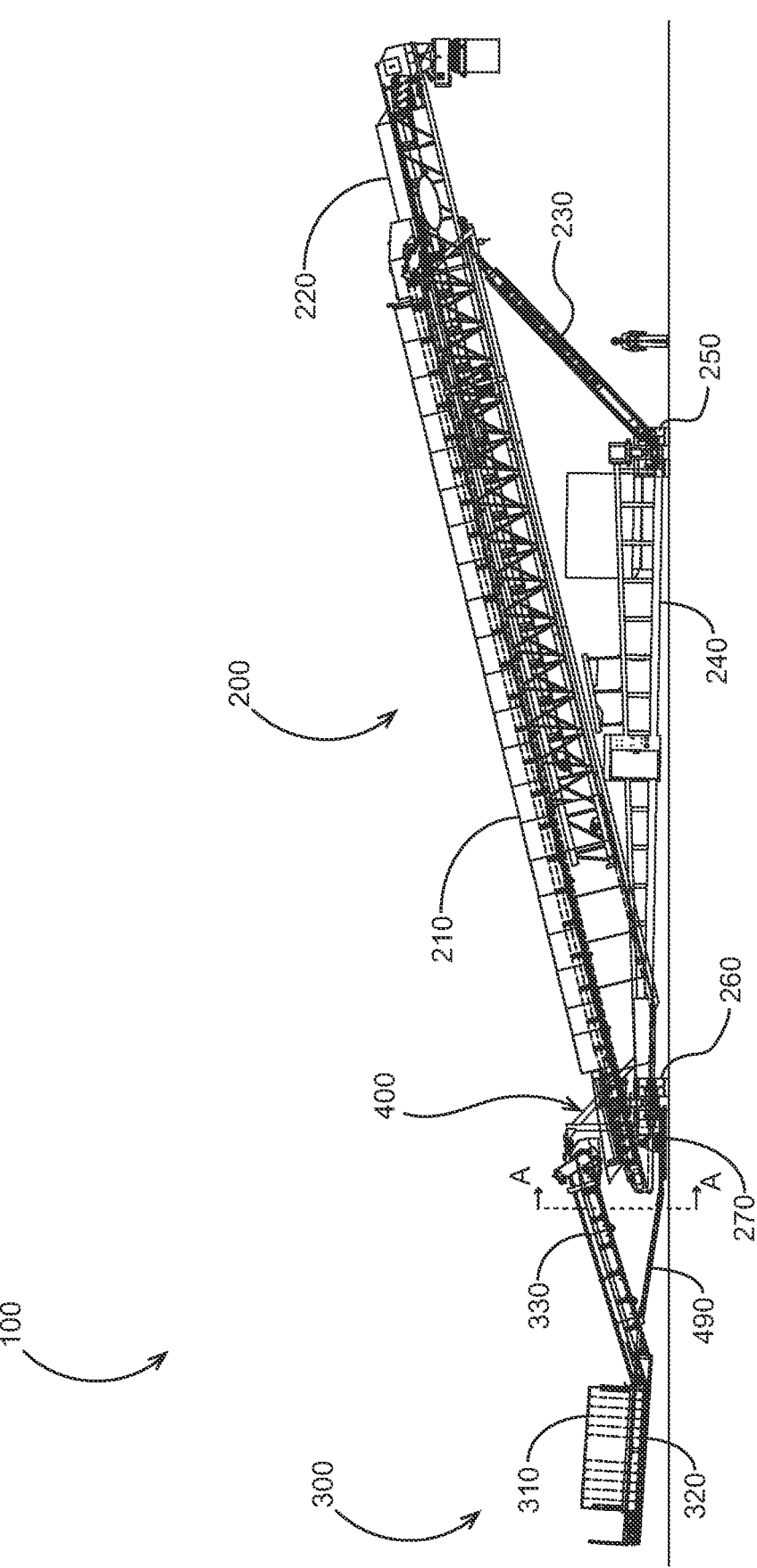
FIG. 3 is a side elevation view of the shiploader system of FIG. 1 in a transport configuration.

Referring to FIGS. 1 and 2, the shiploader system 100 is illustrated in an operating position. The stacking conveyor 200 optionally comprises a conveyor truss 210 supporting a tail pulley and a plurality of conveyor idlers (e.g., troughing idlers) on which an endless conveyor belt is operably supported. The conveyor truss 210 is optionally supported on an undercarriage 240 and is optionally selectively raised and lowered by a telescoping strut 230. The stacking conveyor 200 optionally comprises a stinger truss 220 telescopically extendable relative to the conveyor truss 210 and supporting a head pulley (e.g., motor-driven head pulley) for supporting the conveyor belt. A chute 225 is optionally disposed at a head end of the stinger truss 220. The truck unloader 300 optionally comprises an angled belt conveyor section 330 disposed to deposit material (e.g., aggregate material) onto a tail end of the conveyor 200. The truck unloader 300 optionally comprises one or more ramps 340 for supporting a truck during unloading of material (e.g., aggregate materials) onto an unloading zone 310 (which in various embodiments comprises an open space, grate, etc.). The truck unloader 300 optionally comprises a conveyor section 320 disposed to convey material deposited in the unloading zone 310 onto the conveyor section 330. In some embodiments, the conveyor sections 320, 330 comprise sections of a single conveyor; in other embodiments, each conveyor section 320, 330 comprises a separate conveyor.

In operation, the stacking conveyor 200 is optionally pivotally supported on a tail pivot 270 and supported for radial travel on a forward wheel assembly 250. The forward wheel assembly 250 optionally comprises a pair of laterally extending supports 254-1, 254-2 coupled to the undercarriage 240 and each having axles rollingly supporting one or more wheels 252-1, 252-1, respectively. The wheels 252 are optionally pivotally coupled to the respective supports 254 for pivoting about a generally vertical axis. The wheels 252 are optionally pivotable (e.g., by a rotary actuator or other actuator). In operation, the wheels 252 are optionally oriented for travel along a radial travel path $P_R$.

In operation, the truck unloader 300 is optionally substantially supported on a ground surface while the conveyor 200 pivots about tail pivot 270 relative to the truck unloader. Referring to FIG. 2, positions 300A, 300B, 300C represent various angular positions of the truck unloader 300 relative to the stacking conveyor 200 as the conveyor 200 travels along radial travel path $P_R$.

Figures 4, 5:
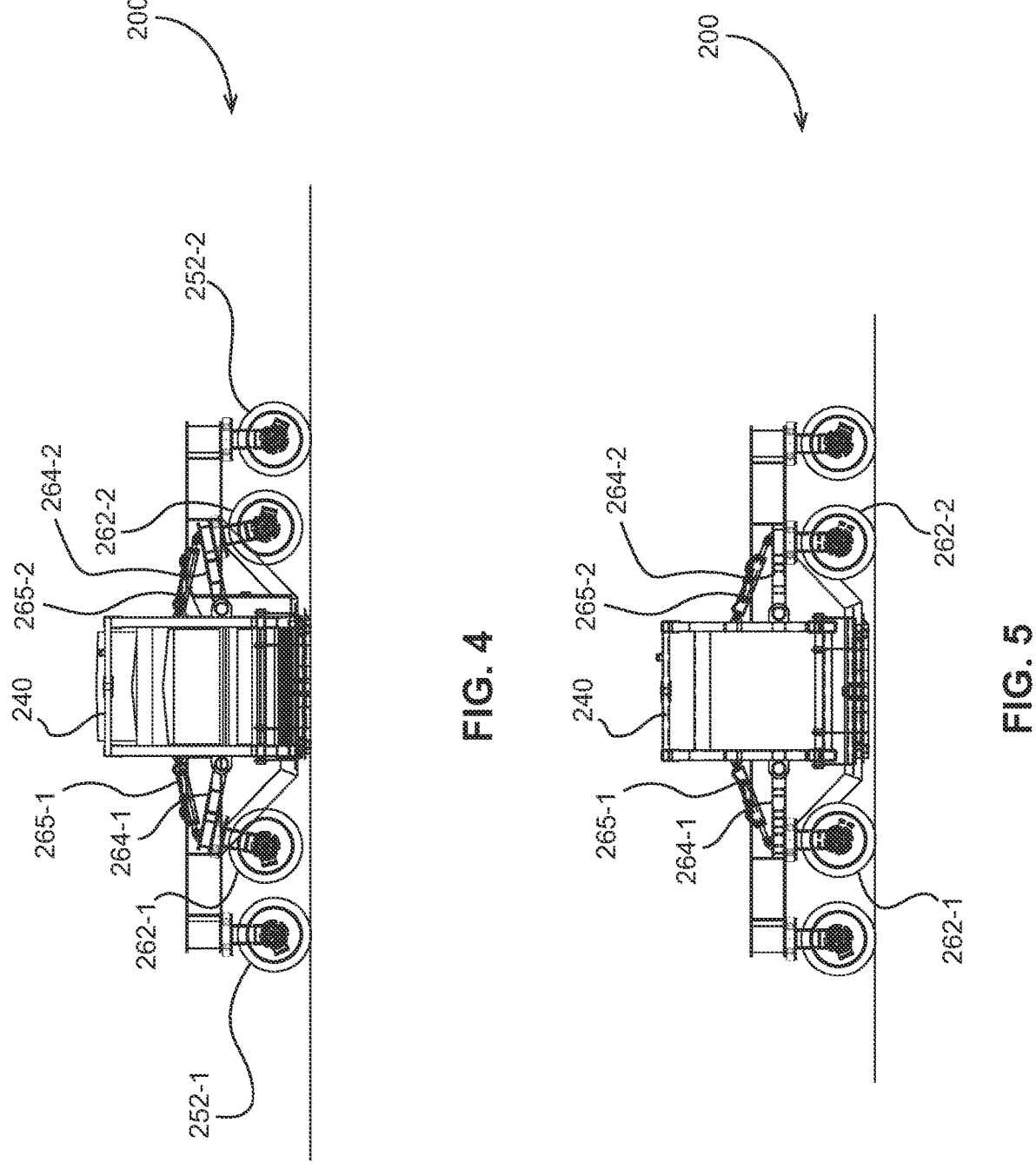
FIG. 4 is a view along section A-A of FIG. 1.
FIG. 5 is a view along section A-A of FIG. 3.
Figure 6:
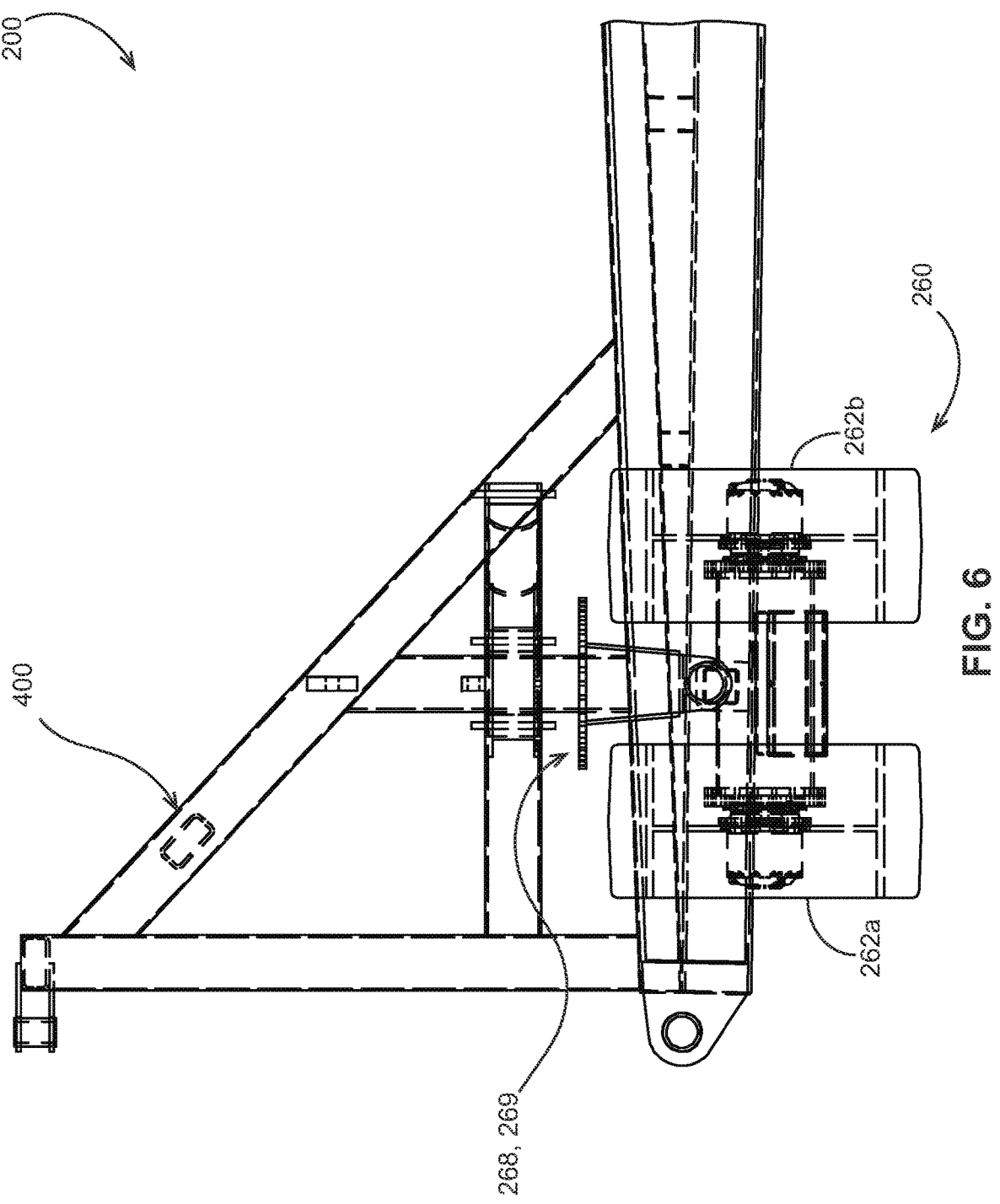
FIG. 6 is a side elevation view of a rearward portion of a stacking conveyor undercarriage of the shiploader system of FIG. 1.

Referring to FIGS. 4-6, the conveyor 200 optionally includes a rear wheel assembly 260 having an operating configuration (shown in FIG. 4) and a transport configuration (shown in FIG. 5). The rear wheel assembly optionally comprises laterally extending supports 264 optionally pivotally coupled at inboard ends thereof to the undercarriage 240. Each support 264 is optionally selectively upwardly pivotable by an actuator 265 coupled at a first end to the undercarriage 240 and at a second end to the support 264. Each support 264 rollingly supports one or more wheels 262 that at least partially support the system 100 for transport in the transport configuration. The wheels 262 are optionally pivotable about generally vertical axis on a pivot connection 268 (see FIG. 6) such as by a rotary actuator 269 or other actuator.

During operation (e.g., radial travel of conveyor 200), the rear wheel assembly 260 of the conveyor 200 is optionally in its operational configuration. In the operational configuration, wheels 262 are raised (e.g., by retracting actuators 265) such that the conveyor 200 is pivotally supported at a rearward end thereof on the tail pivot 270 and forward of the rearward end on the wheel assembly 250.

During transport, the rear wheel assembly 260 is optionally in its transport configuration in which the wheels 262 are lowered (e.g., by extending actuators 265) such that the conveyor 200 is rollingly supported at a rearward end thereof on the rear wheel assembly 260 and forward of the rearward end on the wheel assembly 250. The wheels 252, 262 are optionally pivotable into various orientations in order to enable various transport modes of the system. Referring to FIG. 2, the wheels 252, 262 are optionally pivotable into a longitudinal orientation so as to move the system 100 (e.g., conveyor 200 and truck unloader 300) forward or rearward along a longitudinal path $P_L$. Referring to FIG. 2, the wheels 252, 262 are optionally pivotable into a transverse orientation so as to move the system 100 (e.g., conveyor 200 and truck unloader 300) to the right or left along a transverse path $P_T$. The wheels 252, 262 can optionally be oriented normal to a common center point (e.g., disposed between the wheel assemblies 250, 260 along the length of the conveyor 200) in order to pivot the system 200 (e.g., conveyor 200 and truck unloader 300) about the common center point. In some embodiments, one or more of the wheels 252, 262 are powered (e.g., hydraulically drive) for rotation in order to drive movement of the conveyor in the transport and/or operating configurations.

Figure 7:
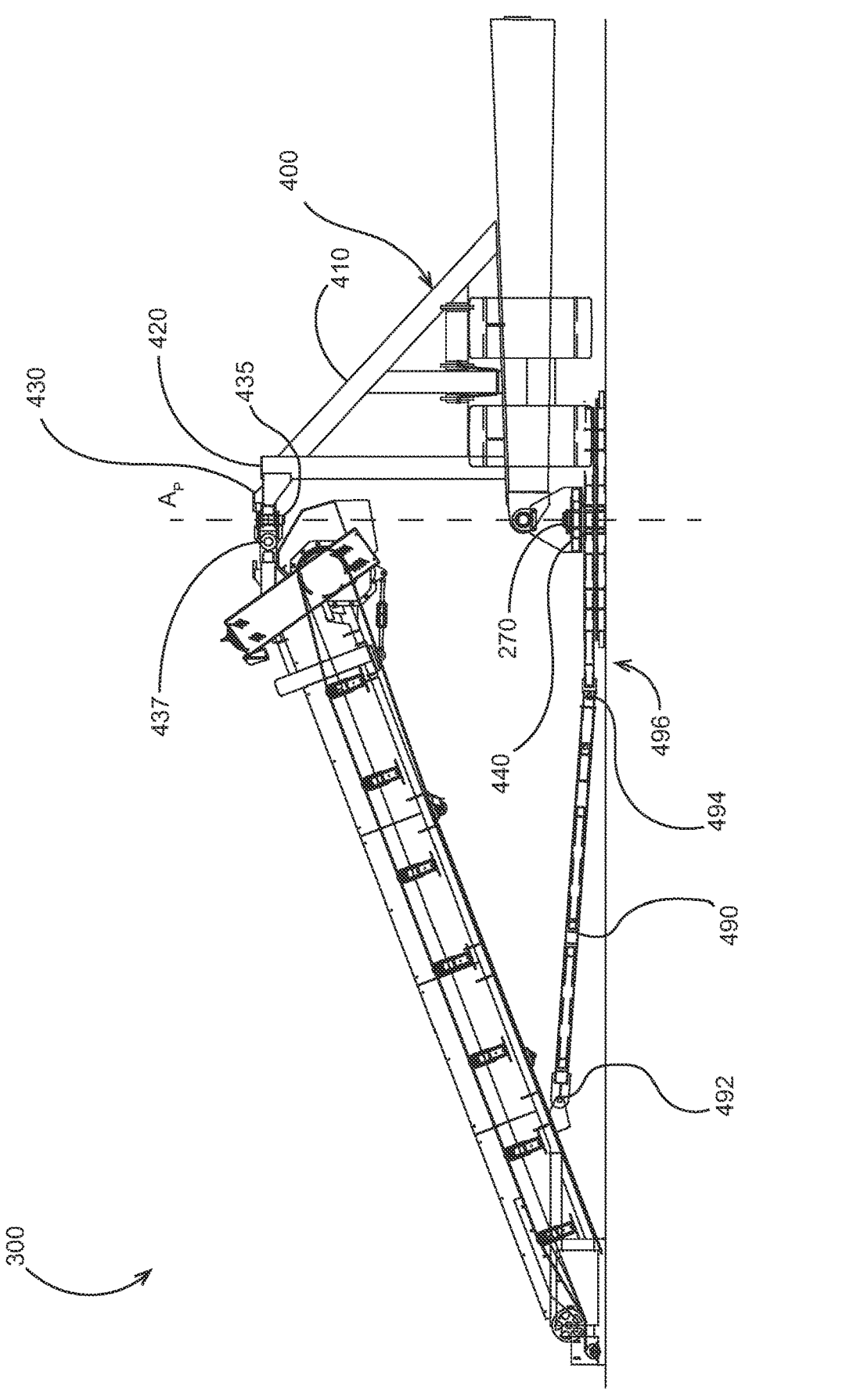
FIG. 7 is an expanded view of a portion of FIG. 1.

In the transport configuration of system 100, the truck unloader 300 is raised such that the truck unloader 300 is at least partially (e.g., substantially, entirely, etc.) supported by the conveyor 200. The truck unloader 300 is optionally raised and/or supported by a coupler 400. Referring to FIG. 7, the coupler 400 optionally includes a vertical support member 420 mounted to the conveyor 200 and optionally supported by an angled support 410 which is also optionally mounted to conveyor 200. The coupler 400 optionally includes a support bracket 430 optionally coupled to the support member 420. The support bracket 430 optionally supports a vertical pivot 435 about which the conveyor 200 is pivotable about a generally vertical pivot axis $A_P$ relative to the truck unloader 300. The vertical pivot axis $A_P$ is optionally aligned with the pivotal axis of the tail pivot 270. A horizontal pivot 437 (e.g., coupled to the vertical pivot 435) pivotally couples the truck unloader 300 (e.g., a discharge end thereof) to the coupler 400 for pivoting the truck unloader about a generally horizontal axis (e.g., to raise and lower the truck unloader relative to the ground surface). A link 490 is pivotally coupled at a first end 492 to the truck unloader 300 (e.g., closer to the loading end than the discharge end thereof) and at a second end 494 to a rearward end of an extendable strut 496. The strut 496 optionally includes one or more actuators (e.g., hydraulic actuators) for extending and retracting a length of the strut 496. Extension of the strut 496 optionally raises the truck unloader 300 relative to the ground surface. Retraction of the strut 496 optionally lowers the truck unloader 300 relative to the ground surface. The strut 496 is optionally mounted to a tail pivot base 440 pivotally supporting the conveyor 200 (e.g., at or near the tail pivot 270) at a forward end of the strut.

Figure 8:
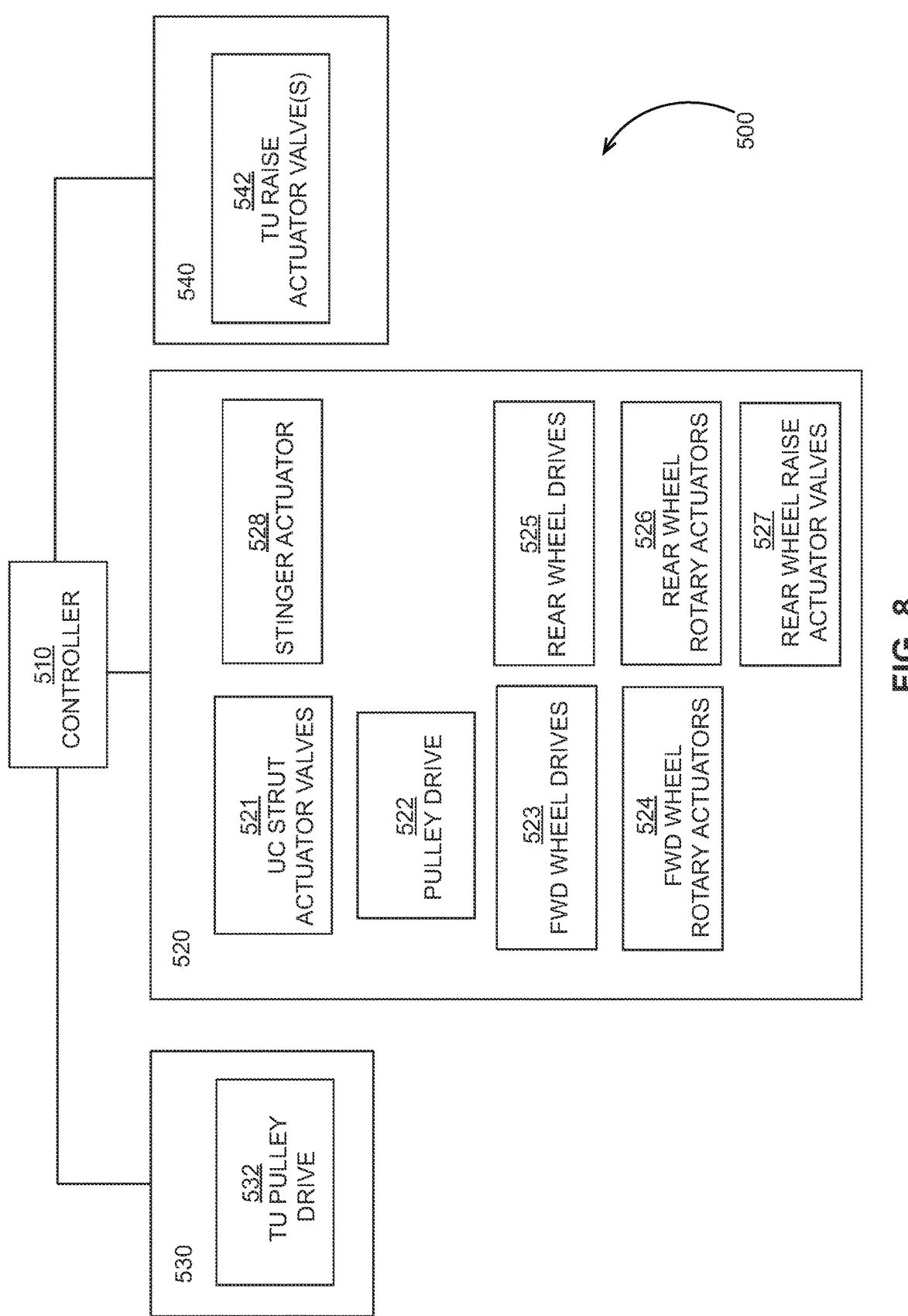
FIG. 8 schematically illustrates an embodiment of a control system for controlling the shiploader system of FIG. 1.
Figure 9:
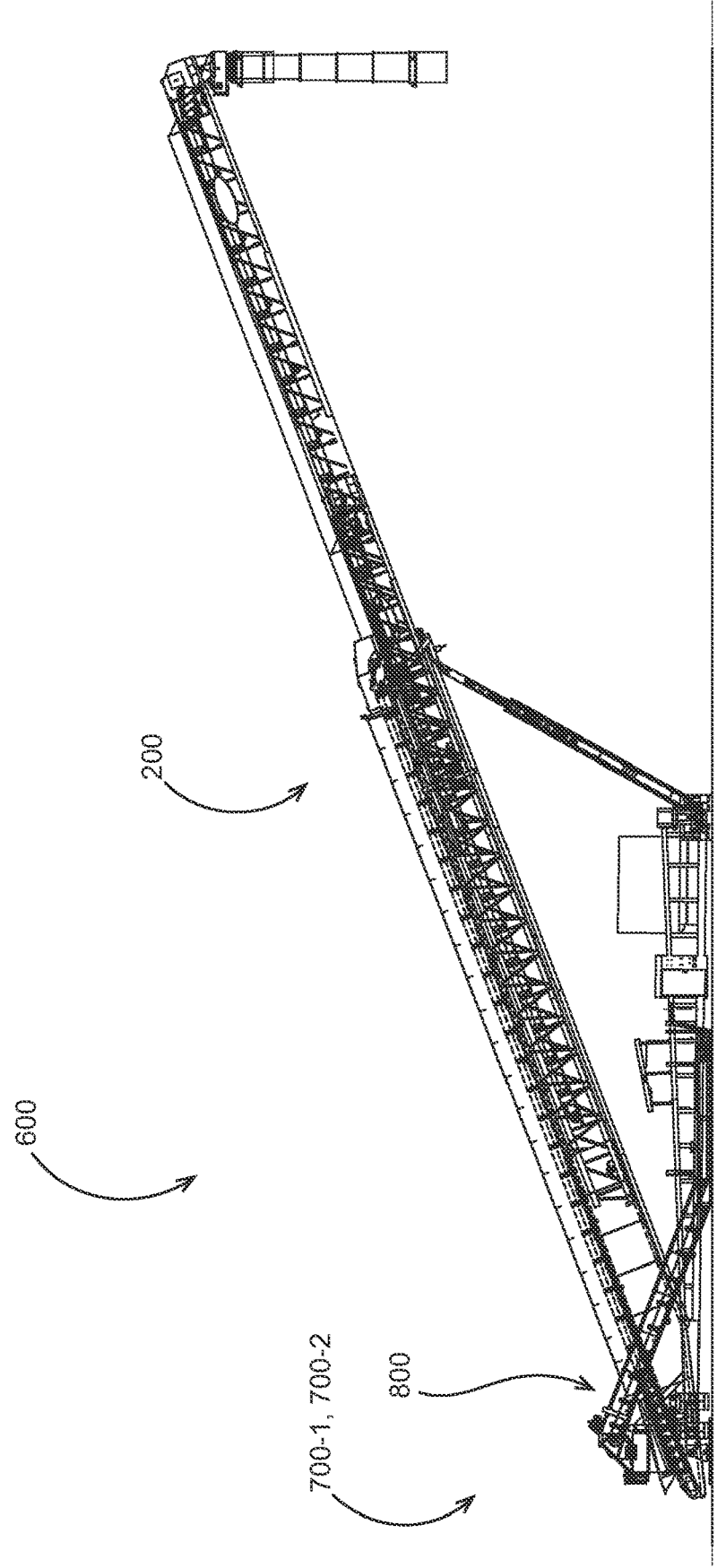
FIG. 9 is a side elevation view of another embodiment of a shiploader system in an operating configuration.

Referring to FIG. 8, an embodiment of a control system 500 for controlling a shiploader system 100 is illustrated schematically. The control system 500 optionally comprises a controller 510 (which may comprise one or more computing devices having a processor, memory, and user interface such as a graphical user interface). The control system 500 optionally comprises a one or more control devices comprising control device arrays 520, 530, 540 for controlling components of the conveyor 200, truck unloader 300, and coupler 400, respectively. The controller 510 is optionally in data communication with one or more (e.g., all) of the control devices of the system 500 and configured to send commands and/or receive information from each control device.

The control device array 530 optionally comprises one or more drives 532 (e.g., electric drives) operably coupled to and configured to drive one or more drive pulleys of the truck unloader (e.g., to drive the belt of the truck unloader conveyor and transfer material onto the conveyor 200).

The control device array 520 optionally comprises one or more undercarriage strut actuator valves 21 in fluid communication with one or more strut actuators configured to alternately extend and retract the strut 230 in order to raise and lower the conveyor truss 210. The array 520 optionally comprises one or more pulley drives 522 (e.g., electric motors, etc.) operably coupled to and configured to drive the head pulley of the conveyor in order to convey material. The array 520 optionally comprises one or more forward wheel drives 523 (e.g., electric motors, hydraulic motors, etc.) configured to drive the forward wheels 252 of the conveyor (e.g., for operational radial travel, various modes of transport travel described herein, etc.). The array 520 optionally comprises one or more rear wheel drives 525 (e.g., electric motors, hydraulic motors, etc.) configured to drive the rear wheels 262 of the conveyor (e.g., for various modes of transport travel described herein, etc.). The array 520 optionally comprises one or more forward wheel rotary actuators 524 (e.g., electric motors, hydraulic motors, etc.) configured to selectively turn the forward wheels 252 into the various orientations described herein. The array 520 optionally comprises one or more rear wheel rotary actuators 526 (e.g., electric motors, hydraulic motors, etc.) configured to selectively turn the forward wheels 262 into the various orientations described herein. The array 520 optionally comprises one or more rear wheel raise actuator valves in fluid communication with and configured to selectively extend and retract the actuators 265 in order to raise and lower the rear wheels 252. The array 520 optionally include a stinger truss actuator 528 (e.g., winch, hydraulic actuator, etc.) for selectively extending and retracting the stinger truss of the conveyor 200.

The control device array 540 optionally comprises one or more truck unloader raise actuator valves in fluid communication with and configured to selectively extend and retract one or more actuators of the strut 496 in order to selectively raise and lower the truck unloader 300.

In order to reconfigure from a transport configuration to an operational configuration, the control system 500 optionally lowers the truck unloader 300 to the ground, raises the rear wheels 252 from the ground, and/or orients the forward wheels 262 for radial travel along radial travel path $P_R$.

In order to reconfigure from an operational configuration to a transport configuration, the control system 500 optionally raises the truck unloader 300 from the ground, lowers the rear wheels 252 to the ground, and/or orients the forward and rear wheels 252, 262 for travel in one of the transport modes described herein. In the operational configuration, the control system 500 optionally drives the pulley drives of the truck unloader 300 and/or conveyor 200. In the operational configuration, the control system selectively drives the forward wheels for radial travel and/or selectively extends and retracts the stinger truss 220 in order to position the head end of the conveyor (e.g., in order to deposit material to a desired location such as an opening in a ship, etc.).

Referring to FIGS. 9-12, an embodiment of a shiploader system 600 is illustrated. System 600 optionally shares one or more features or functionalities of the system 100 described herein. The system 600 differs from the system 100 at least in that the system 600 includes one or more truck unloaders 700 disposed laterally on one or both sides of conveyor 200. The system 600 optionally includes a modified coupler 800 pivotally coupling one or more truck unloaders 700 to the conveyor 200.

Figure 12:
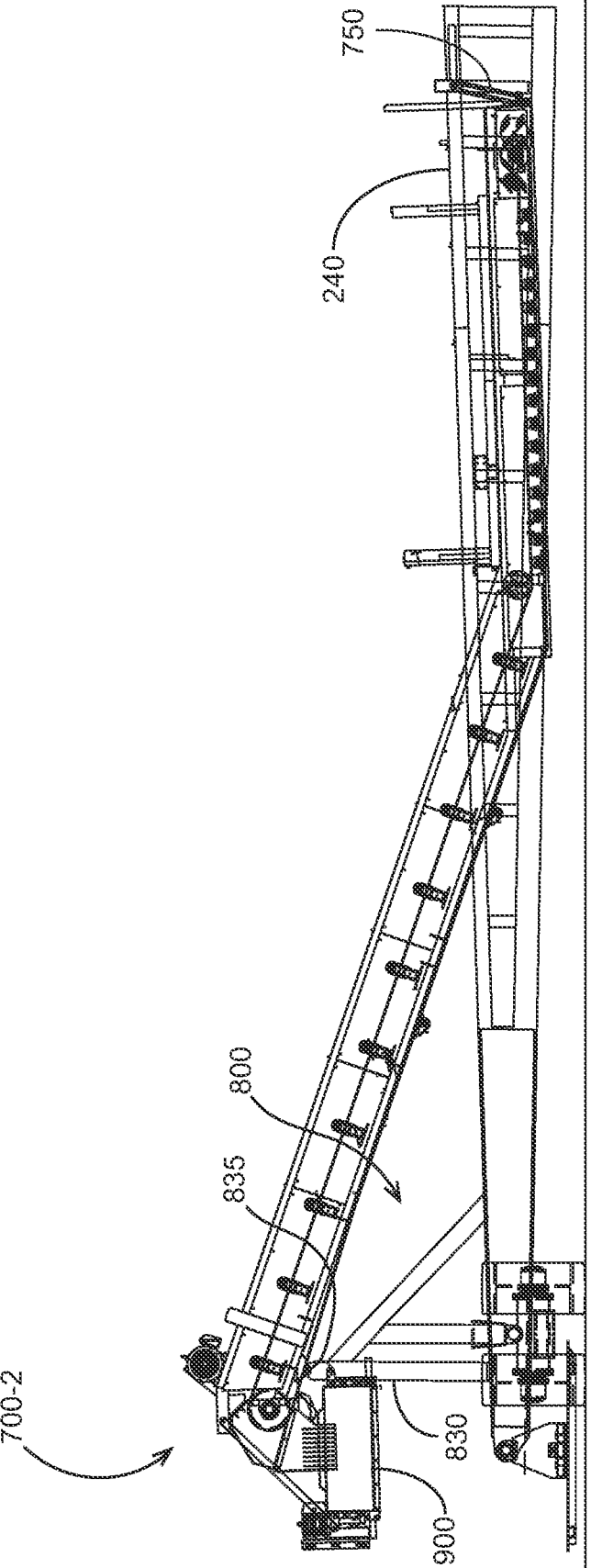
FIG. 12 is an expanded view of a portion of FIG. 11.

Referring to FIG. 12, the modified coupler 800 optionally comprises a vertical support 830 supporting a horizontally extending pivot 835 (e.g., pivot rod, etc.) to which one or more truck unloaders 700 are pivotally coupled. Each truck unloader 700 is optionally coupled to the undercarriage 240 by an actuator 750 (e.g., hydraulic actuator, etc.) configured to selectively raise and lower the truck unloader (e.g., by pivoting the truck unloader about the pivot 835).

Figure 10:
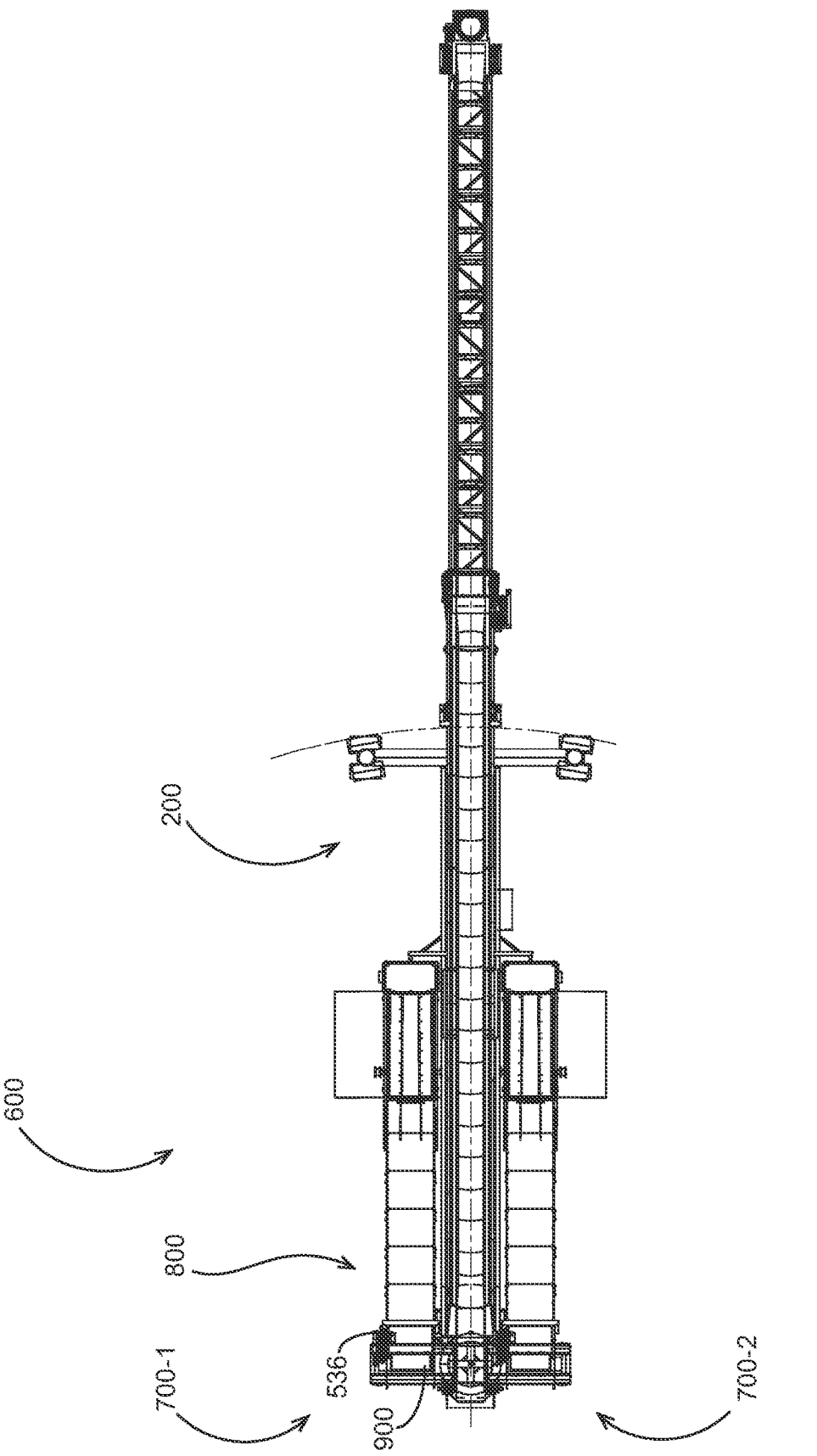
FIG. 10 is a top view of the shiploader system of FIG. 9 in an operating configuration.
Figure 11:
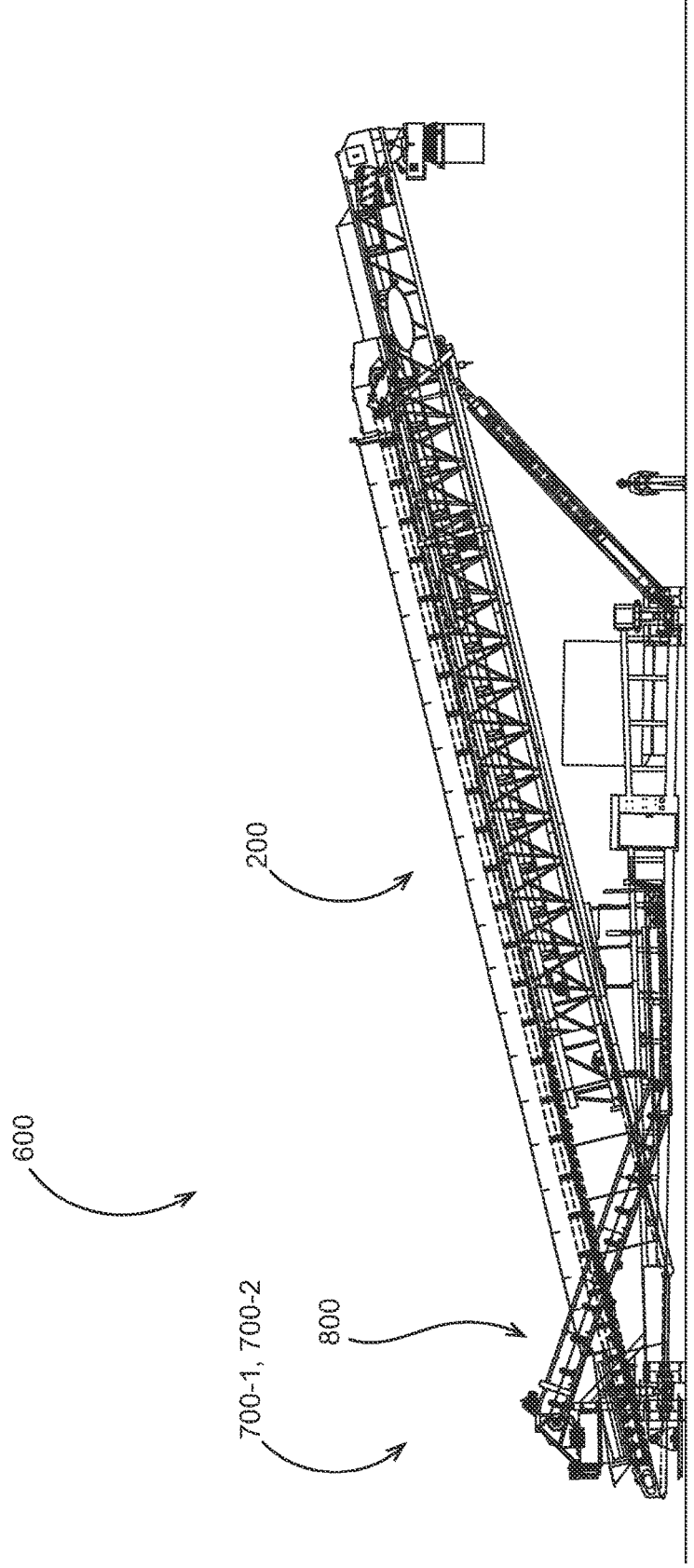
FIG. 11 is a side elevation view of the shiploader system of FIG. 9 in a transport configuration.

Referring to FIGS. 10 and 12, the system 600 optionally comprises a cross conveyor 900 oriented and disposed to convey material from a discharge end of one or more truck unloaders 700 to a loading end of the conveyor 200.

Figure 13:
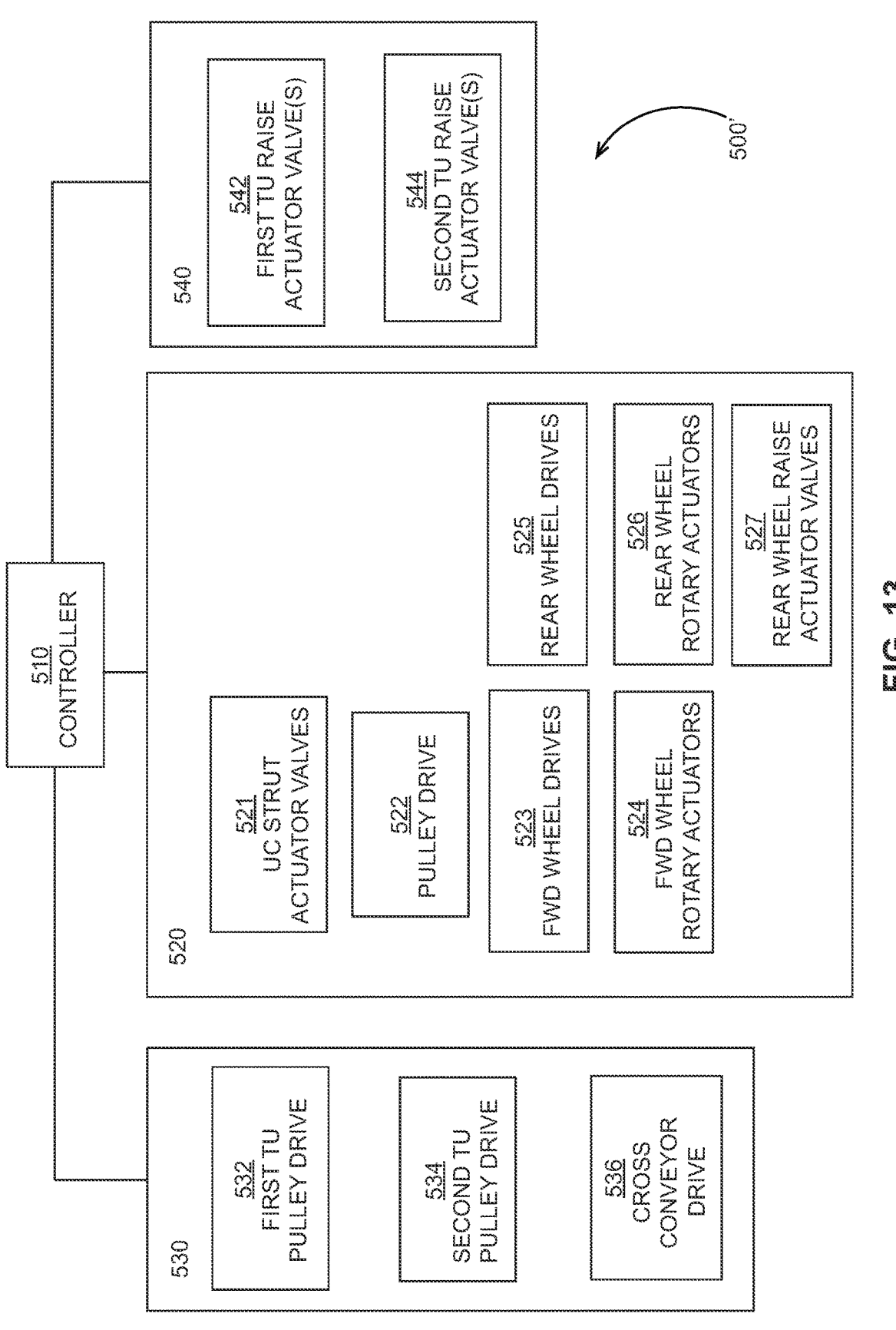
FIG. 13 schematically illustrates an embodiment of a control system for controlling the shiploader system of FIG. 9.

Referring to FIG. 13, an embodiment of a modified control system 500' for controlling a shiploader system 100 is illustrated schematically. The control system 500' optionally has one or more common features or functionalities with the control system 500. The control system 500' comprises one or more pulley drives 532, 534 operably coupled to and configured to drive respective head pulleys of truck unloaders 700-1, 700-2, respectively. The control system 500' optionally comprises one or more cross conveyor drives 536 configured to drive the cross conveyor 900. The control system 500' optionally comprises one or more control valves 542, 544 in fluid communication with and configured to selectively extend and retract one or more actuators 750 associated with one or more truck unloaders 700.

The conveyor embodiments described herein optionally have one or more common features or functionalities with the conveyor embodiments disclosed in U.S. Pat. No. 7,618, 231, incorporated herein by reference. The truck unloader embodiments described herein optionally have one or more common features or functionalities with the truck unloader embodiments disclosed in U.S. Pat. No. 8,684,161, incorporated herein by reference.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A shiploader system having a transport configuration and an operational configuration, comprising:
   a radial stacking conveyor having a first pulley and a first pulley drive operably coupled to said first pulley;
   a truck unloader comprising an unloading zone having an unloading zone conveyor section, said conveyor section operably coupled to a second conveyor, said second conveyor having a second pulley and a second pulley drive operably coupled to said second pulley;
   a coupler, said coupler coupling the truck unloader to said radial stacking conveyor for pivoting about a vertical axis, wherein said unloading zone conveyor section of said truck unloader is raised off the ground in the transport configuration and wherein said unloading zone conveyor section is lowered into contact with the ground in the operational configuration, said coupler at least partially supporting the truck unloader at least partially behind the radial stacking conveyor in the transport configuration; and
   a link, said link being operably coupled to said radial stacking conveyor at a first end thereof, said link being operably coupled to said truck unloader, said link at least partially supporting said weight of said truck unloader in the transport configuration at a location behind said radial stacking conveyor such that said unloading zone is disposed fully behind said radial stacking conveyor in the transport configuration.

2. The shiploader system of claim 1, wherein said coupler pivotally couples the truck unloader to said radial stacking conveyor.

3. The shiploader system of claim 1, wherein said coupler comprises an upper pivot, said upper pivot being coaxial with a tail pivot of said radial stacking conveyor.

4. The shiploader of claim 1, wherein said truck unloader is coupled to said radial stacking conveyor by a strut, said strut being configured to raise said truck unloader into said transport configuration.

5. The shiploader of claim 1, wherein said truck unloader is coupled to said radial stacking conveyor by an extendable strut.

6. The shiploader system of claim 1, wherein said truck unloader is in end-to-end relation to said radial stacking conveyor in both the transport configuration and the operational configuration.

7. The shiploader system of claim 1, wherein said truck unloader is in end-to-end relation to said radial stacking conveyor in both the transport configuration and the operational configuration.

8. The shiploader system of claim 1, wherein a truck unloader is in side-by-side relation to said radial stacking conveyor.

9. The shiploader system of claim 1, wherein said truck unloader is in side-to-side relation to said radial stacking conveyor in both the transport configuration and the operational configuration.

10. The shiploader system of claim 1, wherein said radial stacking conveyor comprises a forward wheel assembly and a rear wheel assembly.

11. The shiploader system of claim 10, wherein said forward wheel assembly and said rear wheel assembly cooperatively enable said radial stacking conveyor to move in a transverse direction.

12. The shiploader system of claim 10, wherein said forward wheel assembly and said rear wheel assembly cooperatively enable said radial stacking conveyor to rotate around a point disposed between said forward wheel assembly and said rear wheel assembly.

13. A shiploader control system for a shiploader system having a transport configuration and an operational configuration, the shiploader system having a radial stacking conveyor with a first head-end drive pulley, the shiploader system having a truck unloader with a second head-end drive pulley and an unloading zone conveyor section, the unloading zone conveyor section being disposed on the ground in the operational configuration, the shiploader system having an actuator disposed to raise the truck unloader from the ground, the control system comprising:
   a first pulley drive configured to drive the first head-end drive pulley;
   a second pulley drive configured to the second head-end drive pulley;

at least a first truck unloader raise actuator valve, the truck unloader raise actuator valve being configured to alternately retract and extend the actuator of the shiploader system in order to alternately (a) raise the truck unloader unloading zone conveyor section from the ground to the transport configuration such that said truck unloader unloading zone conveyor section is supported by said radial stacking conveyor and disposed fully behind said radial stacking conveyor in the transport configuration and (b) lower the truck unloader conveyor section toward and into contact with the ground;

at least a first forward wheel drive configured to drive a forward wheel of a forward wheel assembly of the radial stacking conveyor, wherein said forward wheel assembly is operably coupled to said radial stacking conveyor, wherein said forward wheel is configured to transport said radial stacking conveyor in the transport configuration such that said truck unloader is transported along with said radial stacking conveyor; and a controller in data communication with said first truck unloader raise actuator valve.

14. The control system of claim 13, wherein said controller is in data communication with said first forward wheel drive.

15. The control system of claim 14, further comprising a rear wheel drive operably coupled to a rear wheel drive.

16. The control system of claim 15, wherein said controller is in data communication with said first forward wheel drive and said rear wheel drive.

17. The control system of claim 16, wherein said controller is configured to operate said first forward wheel drive and said rear wheel drive in order to move the shiploader system alternately in a transverse direction and a rotational direction.

18. The control system of claim 13, further comprising:

a cross conveyor drive configured to drive a cross conveyor of said truck unloader.

19. The control system of claim 13, wherein said controller is in data communication with at least one of said first pulley drive and said second pulley drive.

20. The control system of claim 13, wherein said first pulley drive is operably coupled to the first head-end drive pulley, wherein said second pulley drive is operably coupled to the second head-end drive pulley, wherein said actuator valve is operably coupled to the actuator, and wherein said first forward wheel drive is operably coupled to said forward wheel.

* * * * *